(12) United States Patent
Takada

(10) Patent No.: US 6,785,831 B2
(45) Date of Patent: Aug. 31, 2004

(54) POWER CONSUMPTION MANAGEMENT APPARATUS

(75) Inventor: Shuichi Takada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/309,234

(22) Filed: Dec. 4, 2002

(65) Prior Publication Data

US 2003/0110406 A1 Jun. 12, 2003

(30) Foreign Application Priority Data

Dec. 6, 2001 (JP) ........................................ 2001-372567

(51) Int. Cl.⁷ .............................................. G06F 1/26
(52) U.S. Cl. ...................... 713/323; 713/320; 713/322
(58) Field of Search ................................ 713/320, 322, 713/323, 300

(56) References Cited

U.S. PATENT DOCUMENTS 5,996,084 A  * 11/1999  Watts ........................ 713/323
6,204,695 B1    3/2001  Alfke et al. .................... 326/93
6,397,340 B2 *  5/2002  Watts, Jr. et al. ........... 713/322
6,574,739 B1 *  6/2003  Kung et al. .................. 713/322

FOREIGN PATENT DOCUMENTS

JP          4-211819        8/1992

* cited by examiner

Primary Examiner—Jeffrey Gaffin
Assistant Examiner—Harold Kim
(74) Attorney, Agent, or Firm—McDermott Will & Emery LLP

(57) ABSTRACT

A detection unit detects input-request signals or receive signals that correspond to the input-request signals that are sent and received between a specific data-processing apparatus and another apparatus. A judgment unit then determines whether the data-processing apparatus is performing a specific process, based on the status of the data-processing apparatus and detection results from the detection unit. A supply-control unit controls whether or not to supply a synchronization clock to the data-processing means according to judgment results from the judgment unit.

5 Claims, 15 Drawing Sheets

Fig. 10

Truth-value Table for The Request Signals and Receive Signals

| | Request signal 15 | Receive signal 33 | Request signal 34 | Receive signal 41 | Status signal | Second synchronization clock | Graphics apparatus |
|---|---|---|---|---|---|---|---|
| (a): | 0 | 0 | 0 | 0 | 1 | Supply | Processing in progress |
| (b): | 0 | 1 | x | x | 1 | – | – |
| (c): | 1 | 0 | x | x | 1 | Supply | Processing in progress |
| (d): | 1 | 1 | x | x | 1 | Supply | Input in progress |
| (e): | 0 | 0 | 0 | 1 | 1 | – | – |
| (f): | 0 | 0 | 1 | 0 | 1 | Stopped | Waiting for output |
| (g): | 0 | 0 | 1 | 1 | 1 | Supply | Output in progress |
| (h): | x | x | x | x | 0 | Stopped | Waiting |

Note 1: 'X' is 0 or 1
Note 2: '–' is undefined

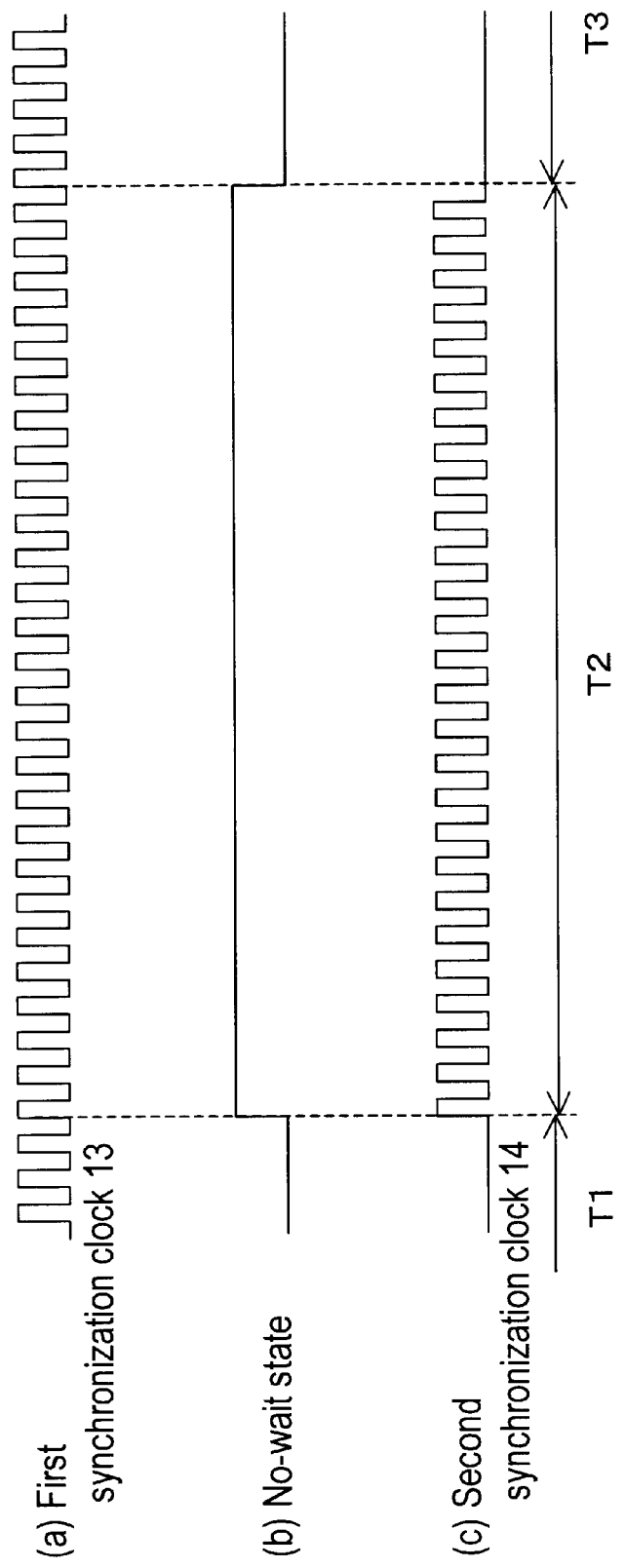

POWER CONSUMPTION MANAGEMENT APPARATUS

BACKGROUND OF THE INVENTION

1. Field of the Invention

This invention relates to a power-consumption-management apparatus, and more particularly to a power-consumption-management apparatus for managing the power consumption of a data-processing apparatus such that it is kept at a minimum.

2. Prior Art of the Invention

For digital equipment that is generally controlled by a synchronization clock, the power consumption is proportional to the product of the operation clock frequency and the square of the operating voltage and the scale of the circuitry, however, in recent years, as the scale of the circuitry increases through the use of LSI, there is a need to reduce the accompanying increase of power consumption.

The basic thinking of how to reduce power consumption is to lower the frequency and reduce the operating power of the operation clock, or to reduce the size of the circuitry. To be more precise, in the case of digital equipment comprising a plurality of blocks, controlling the clocks and supply voltage of the peripheral circuit blocks by CPU control, which controls clocks and supply voltage of circuit blocks that do not require operation, is very effective in reducing the power consumption. For example, the operating circuit blocks differ depending on the application or task that is executed by the CPU, so the CPU can effectively control the power consumption by controlling when to supply or stop an operation clock according to operating conditions such as whether a circuit block operates or not.

A method of controlling power consumption is disclosed in Japanese Patent H4-211819, as shown in FIG. 14.

As shown in FIG. 14, an information-processing apparatus comprises a master block or CPU 1, a slave block or input apparatus 2 such as a keyboard, a graphics apparatus 31 for creating figures and drawings, a memory 4 for storing images and the like, and an output apparatus for displaying the images. Here, the master block or CPU 1 controls the slave block or input apparatus 2, graphics apparatus 31, memory 4 and output apparatus 5, and manages their respective operating state.

For example, when a reproduction instruction and image data to be reproduced having a specified format are input from the input apparatus 2 to the CPU 1, the CPU 1 sends an input-request signal to the graphics apparatus 31. After receiving this input request, the graphics apparatus 31 returns a receive signal to the CPU 1 after it becomes capable of receiving the data, and then the CPU 1 transfers the image data to the graphics apparatus 31.

On the other hand, at the same time that the CPU 1 sends an input request to the graphics apparatus 31, CPU 1 sets a clock-supply command in the control register 11 (for example it sets it to '11'), then, as shown in FIG. 15(b), after receiving this clock-supply command, the clock-control apparatus 12 sets the status signal to '1' to indicate that the graphics apparatus 31 is in the no-wait state. Then, as shown in FIG. 15(c), when this status is received, a second synchronization clock 14 is supplied to the graphics apparatus 31 at period T2 of the this no-wait state.

On the other hand, after the graphics apparatus 31 finishes the required processing, it stores the processed data in the memory 4. At this time as well, the graphics apparatus 31 inputs an input-request signal to the memory 4, and after the graphics apparatus receives a corresponding receive signal from the memory 4, it transfers the data.

When the graphics apparatus 31 enters the no-wait state, the CPU 1 constantly monitors that state, and when it detects that processing by the graphics apparatus 31 has finished, it sets a clock-stop command in the control register 11 (for examples, sets it to '00'), or sets a minimum-clock-speed command (for example, sets it to '01'). When a clock-stop command is set, after receiving the this clock-supply-stop command, the clock-control apparatus 12 sets the status signal to '0' to indicate that the graphics apparatus 31 is in the wait state, as shown in FIG. 15(b). Then, as shown in FIG. 15(c), when this status is received, the supply of the second synchronization clock 14 to the graphics apparatus 31 is stopped at period T1 and T3 of this wait state.

When the minimum-clock-speed command is sent to the control register 11, the status of the graphics apparatus 31 is set to the wait state, and the second synchronization clock 14 that is supplied to the graphics apparatus 31 at period T1 and T3 of this wait state shown in FIG. 15 is set to the minimum frequency (not shown in the figure).

Furthermore, after the CPU 1 activates the graphics apparatus 31, it can move on to a different process if there is no task to be processed, or the CPU 1 can control the supply of its own clock until processing by the graphics apparatus 31 is finished, and reduce power consumption. Even in this state, the CPU 1 monitors the finish state of the graphics apparatus 31 and when the graphics apparatus 31 finishes, the CPU 1 controls the graphics apparatus 31 and sets it to the wait state.

In this way, the CPU 1 (master) controls the supply of the clock to the slave (graphics apparatus 31) while at the same time monitors the status of the slave, and reduces the power consumption of the information-processing apparatus.

However, with the construction described above, the CPU 1 determines whether or not to supply a clock depending on whether or not the graphics apparatus 31 has finished a series of processes, so the following problems occur.

That is, even though the graphics apparatus 31 sends an input-request signal to the memory 4, and even though the status is not to receive a receive signal, or in other words, even though the graphics apparatus 31 is not actually operating, the CPU 1 regards the graphics apparatus 31 as operating, so the clock-supply command that is set in the control register 11 keeps the same status. Therefore, even though the clock is not actually necessary, the second synchronization clock 14 is supplied to the graphics apparatus 31, and power loss occurs.

As the size of the circuitry becomes larger, the CPU 1 cannot sufficiently control the supply of the clocks, and further loss occurs.

In other words, for a data-process apparatus, for example a graphics apparatus 31, a parallel-processing circuit, such as a pipeline, is often used, however, by doing so, the size of the circuitry of the graphics apparatus 31 increases according to the number of parallel circuits, and in the case of a pipeline, the input data are processed and output sequentially at each stage of the pipeline, so response delays occur according to the number of stages of the pipeline.

In the case of using prior clock control, it is possible to control the clocks for the entire block of parallel processing circuits, however, in the case of a pipeline or the like which performs mutual transfer of data, controlling the clocks for only part of a circuit block becomes difficult. Therefore, as the use of parallel-processing circuits increases, the graphics apparatus 31, which comprises parallel-processing circuits, consumes a proportional amount of power.

Furthermore, by arranging the graphics apparatus 31 in parallel by using pipeline construction for example, response delays occur as described above according to the number of pipeline stages, so even though processing in an early stage of the pipeline is finished, the CPU 1 cannot perform control to stop the clock supply until processing in each stage of the pipeline is finished. Therefore, further power loss occurs.

As described above, in the prior clock control, when the circuitry is arranged in parallel in order to increase speed, a problem existed in that it was difficult to perform detail power control through monitoring by the master or CPU.

SUMMARY OF THE INVENTION

The object of this invention, proposed based on the problems of the prior art described above, is to provide a power-consumption-management apparatus that manages and reduces the power consumption of a data-processing apparatus independently from the control monitored and performed by the CPU.

To accomplish the object of this invention, this power-consumption-management apparatus employs the following means. That is, as shown in FIG. 2, this invention comprises a detection means 50, judgment means 51 and supply-control means 52, which will be described below.

The detection means 50 detects input-request signals or receive signals that correspond to the input-request signals that are sent and received between a specific data-processing apparatus and another apparatus. The judgment means 51 determines whether the data-processing apparatus is performing a specific process, based on the status of the data-processing apparatus and detection results from the detection means 50. The supply-control means 52 controls whether or not to supply a synchronization clock to the data-processing means according to judgment results from the judgment means 51.

With this kind of construction, the status, request signals and receive signals of a specific data-processing apparatus, whose power consumption is managed by the power-consumption-management apparatus 32, are input to the power-consumption-management apparatus 32 from the data-processing apparatus, so the power-consumption-management apparatus 32 can detect whether the data-processing apparatus is performing data input, output, processing or waiting for input or output, and supplies a synchronization clock only when the data-processing apparatus is performing data input, processing or output, and stops supply of the synchronization clock at all other times, and thus is able to reduce the power consumption of the data-processing apparatus.

BRIEF DESCRIPTION OF THE DRAWINGS

The embodiments of the invention will be explained in detail according to the drawings.

FIG. 10 is a Boolean algebra truth-value table showing the operation for supplying and stopping the synchronization clock in the first embodiment of the invention.

FIG. 15 is a time chart showing the synchronization clock of a graphics apparatus using prior technology.

DESCRIPTION OF THE PREFERRED EMBODIMENTS (Embodiment 1)

Figure 1:
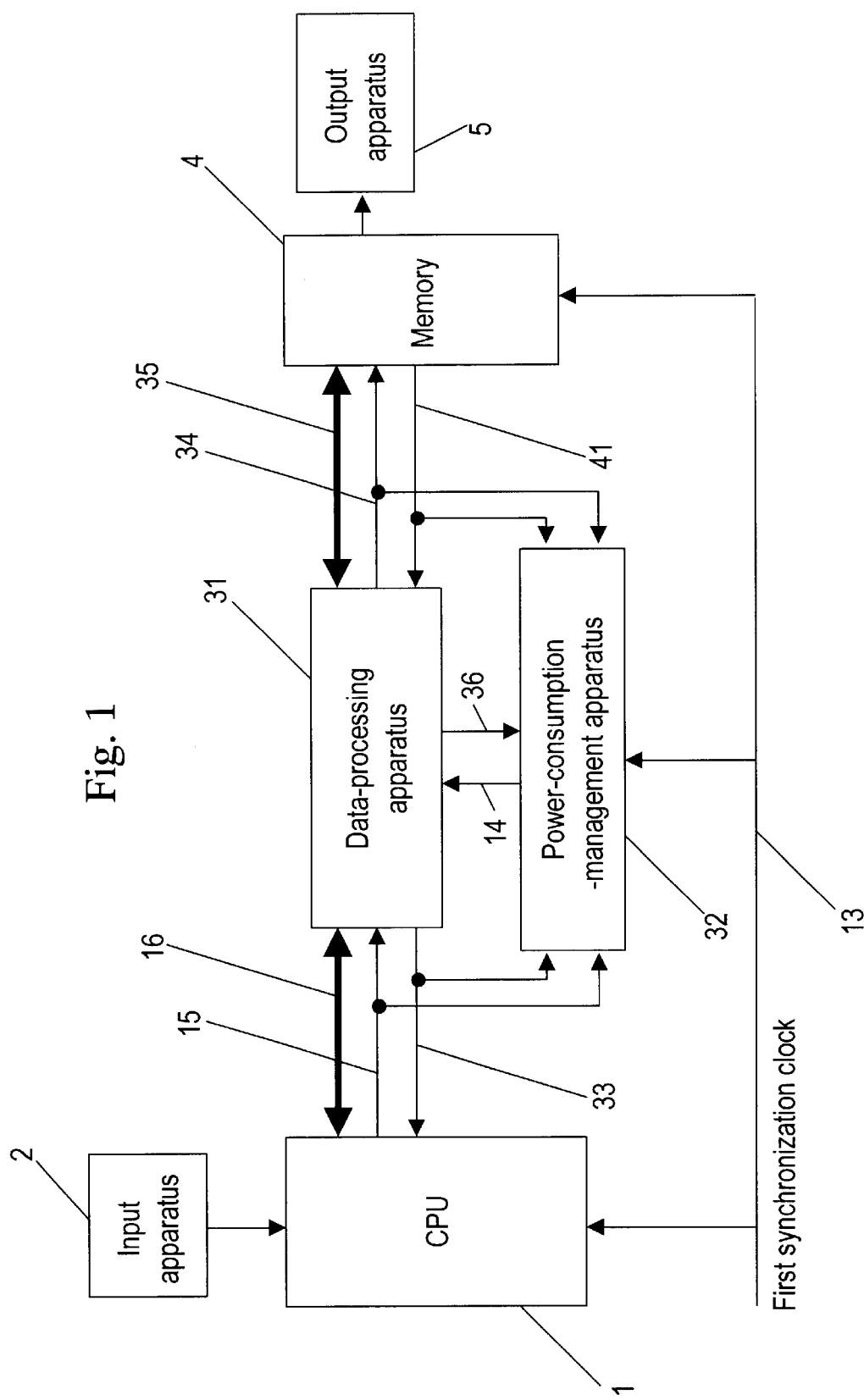
FIG. 1 is a block diagram of the functions of an information-processing apparatus of a first embodiment of the invention.

FIG. 1 is a block diagram of the functions of an information-processing apparatus of a first embodiment of the invention. A mobile terminal, having a graphics function, is explained as an example of the information-processing apparatus in FIG. 1.

When image data is input in a specified format from an input apparatus 2, the CPU 1 sends an input-request signal to the data-processing apparatus 31 requesting that data be transferred to the data-processing apparatus 31. At this time, if the data-processing apparatus 31 is in a state such that it is capable of receiving data, it returns a receive signal 33 corresponding to the input-request signal, and when the CPU 1 receives this receive signal 33, it transfers the input image data 16 to the data-processing apparatus 31. The data-processing apparatus 31 that received this image data 16 executes the necessary processing, such as processing drawings.

Furthermore, the image data 16, which was processed as necessary by the data-processing apparatus 31, is then written in memory 4 as processed image data 35. Before the data is written in the memory 4, an input-request signal is sent from the data-processing apparatus 31, and if the memory 4 is such that it is capable of receiving the processed data, it sends a receive signal 41 to the data-processing apparatus 31.

The input-request signal that is output from the CPU 1 (or from the data-processing apparatus 31) and the receive signal 33 (or receive signal 41) that is output from the data-processing apparatus 31 (or memory 4) are also input to the power-consumption-management apparatus 32. Furthermore, a status signal 36 is input to the power-consumption-management apparatus 32 from the data-processing apparatus 31 indicating that the data-processing apparatus 31 is performing a processing operation and is in the no-wait state, or that processing has stopped and that it is waiting.

Figure 2:
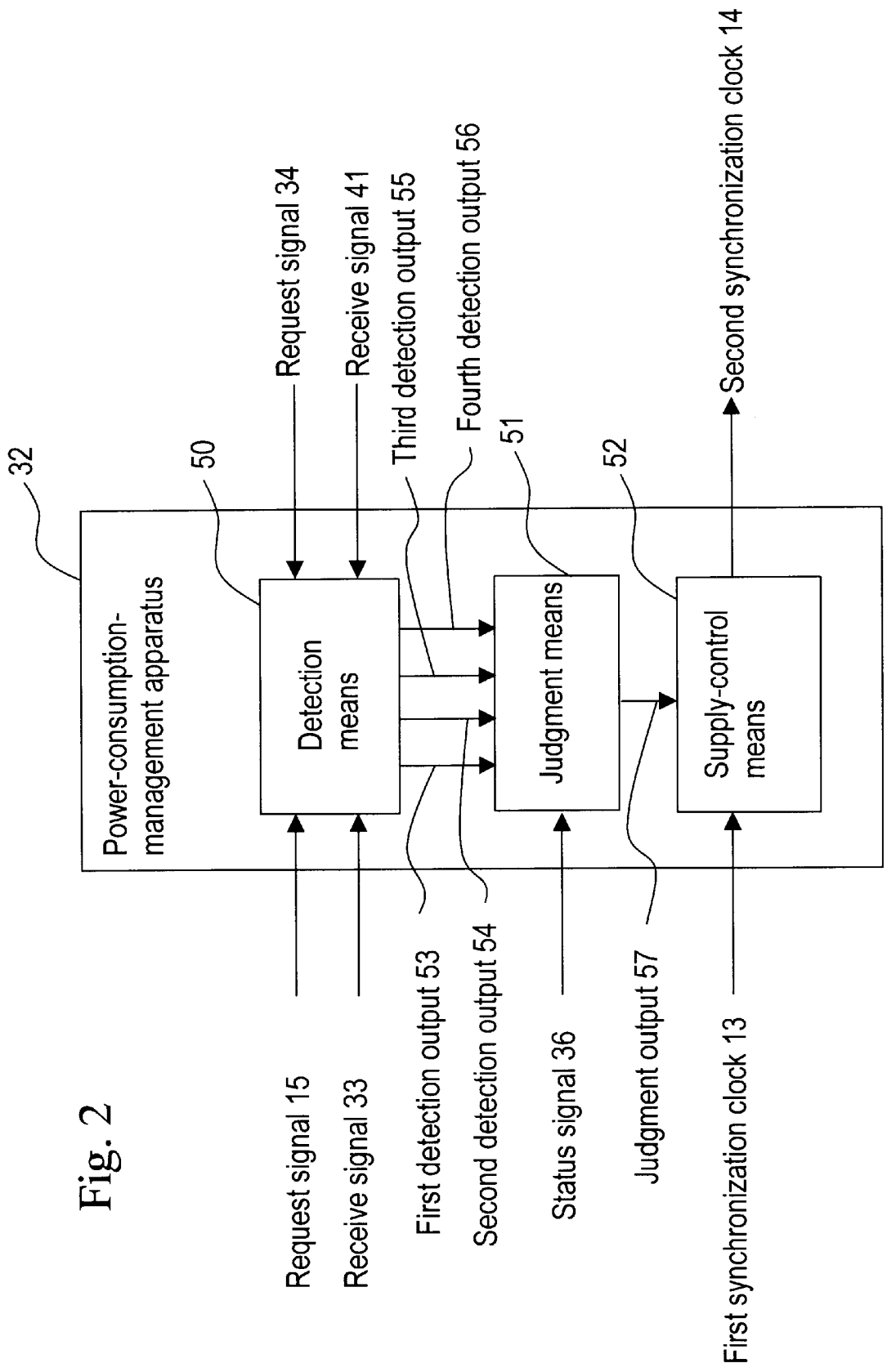
FIG. 2 is a block diagram of the functions of a power-consumption management apparatus of the first embodiment of the invention.

FIG. 2 is a block diagram of the functions of a power-consumption-management apparatus of the first embodiment of the invention.

A detection means 50 detects the input-request signal, request signal 15, that is output to the data-processing apparatus 31 from the CPU 1, the receive signal 33 that is output to the CPU 1 from the data-processing apparatus 31, the input-request signal, request signal 34, that is output from the data-processing apparatus 31 to the memory 4, and the receive signal 41 that is output from the memory 4 to the data-processing apparatus 31, and inputs a first detection output 53, second detection output 54, third detection output 55 and fourth detection output 56 to a judgment means 51, respectively (the above detection outputs 53–56 will be described later). Furthermore, as will be explained in detail later, the judgment means 51 determines the state of the data-processing apparatus 31, for example, input, output, processing, or waiting for input/output, based on the first detection output 53, second detection output 54, third detection output 55 and fourth detection output 56 and the status signal 36 that was input from the data-processing apparatus 31. Also, a supply-control means 52 controls whether or not to supply a second synchronization clock 14 to the data-processing apparatus 31 according to the judgment results by the judgment means 51.

Figure 3:
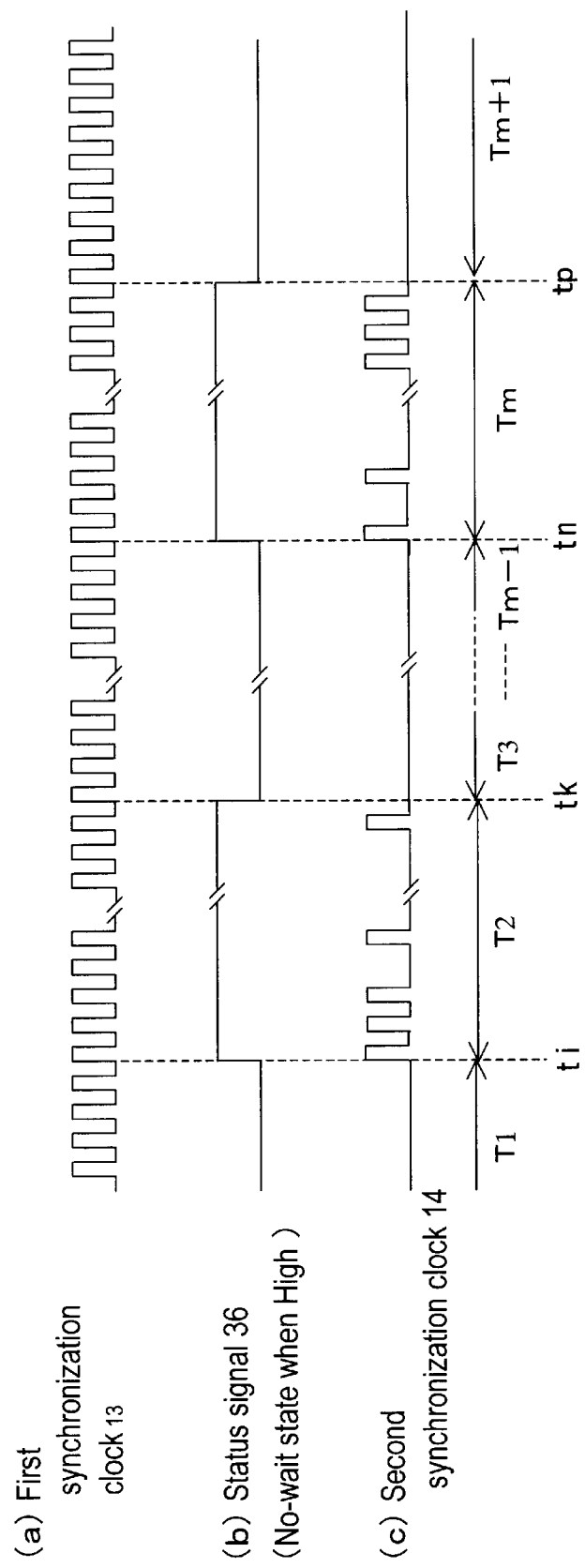
FIG. 3 is a time chart showing the operation of the power-consumption management apparatus of the first embodiment of the invention.

FIG. 3 is a time chart showing the operation of the power-consumption management apparatus of the invention.

As shown in FIG. 3(a), a first synchronization clock 13 is constantly and continuously supplied to the supply-control means 52 of the power-consumption-management means 32. Also, the status signal 36 (see FIG. 3(b)) that is output from the data-processing apparatus 31, for example a graphics apparatus (hereafter, a graphics apparatus will be used as one example of the data-processing apparatus 31), to the power-consumption-management apparatus 32 is 'H' (high status) at time ti (or to be more precise, the rising edge of the next clock after time ti) of the first synchronization clock 13 and designates the no-wait, and becomes 'L' (low status) at time tk (or to be more precise, the rising edge of the next clock after time tk) and designates the wait state. This status is repeated while the mobile terminal is operating.

In this repeated no-wait state or wait state, the power-consumption-management apparatus 32 stops supply of the second synchronization clock 14, as shown in FIG. 3(c), during period T1, T3, . . . , Tm−1, Tm+1 of the wait state, and, as will be explained later, in this invention, the power-consumption-management apparatus 32 also controls whether or not to supply the second synchronization clock 14 to the graphics apparatus 31 during the periods T2, . . . , Tm of the no-wait state.

Figure 4:
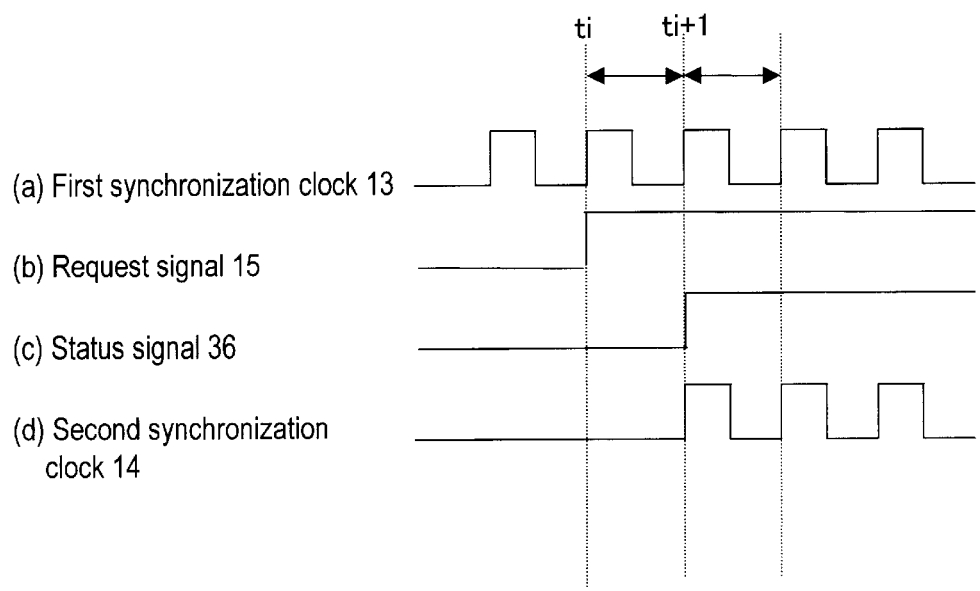
FIG. 4 is a time chart showing the operation of switching a status signal between 'L' and 'H' in the first embodiment of the invention.

FIG. 4 is a time chart showing one example of switching the status signal 36 between 'L' and 'H'.

When the status signal 36 shown in FIG. 4(c) is 'L', or in other words, when the graphics apparatus 31 is in the wait state, the second synchronization clock 14 shown in FIG. 4(d) is supplied from the power-consumption-management apparatus 32 to the graphics apparatus 31 at the next time ti+1 (time corresponding to the next clock after the clock that corresponds to time ti) after time ti when the detection means 50 of the power-consumption-management apparatus 32 detected the request signal 15 from the CPU 1 shown in FIG. 4(b). Therefore, the status signal 36 shown in FIG. 4(c) that corresponds to the status of the graphics apparatus 31 becomes 'H' at time ti+1, and the status of the graphics apparatus 31 switches from the wait state to the no-wait state.

The judgment means 51 receives this status and sets the judgment output 57 to 'H', for example, and the supply-control means 52 supplies the second synchronization clock 14 to the graphics apparatus 31.

Switching the status signal 36 from the no-wait state to the wait state is executed by the graphics apparatus 31 when the graphics apparatus 31 is finished with the processing operation such as input, processing, output or waiting for output of image data 16 or image data 35.

Figure 5:
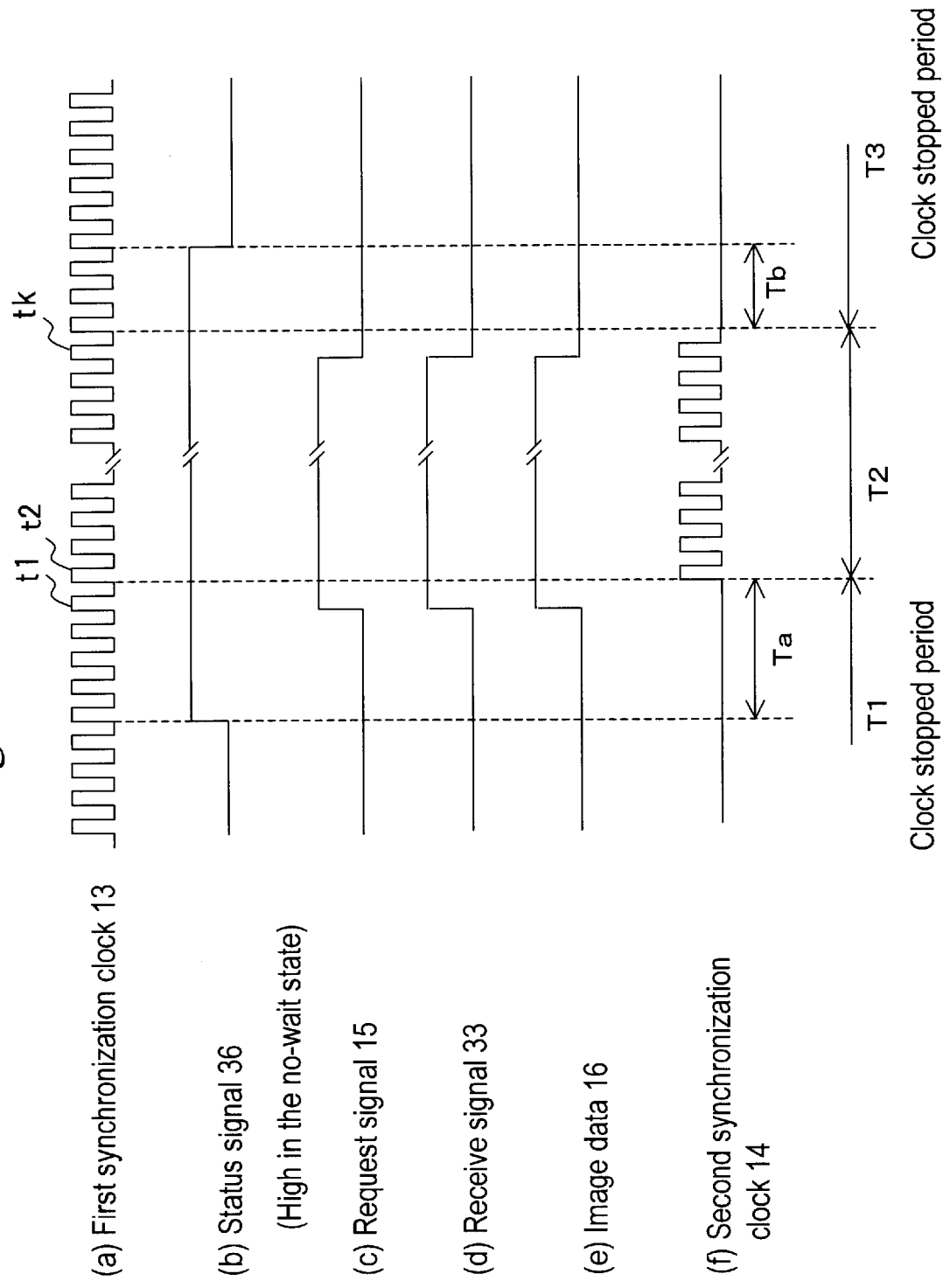
FIG. 5 is a time chart showing the input of data from the CPU to a graphics apparatus in the first embodiment of the invention.

FIG. 5 is a time chart showing the relationship between the data input from the CPU 1 to the graphics apparatus 31 and the second synchronization clock 14. When the status signal 36 shown in FIG. 5(b) is 'H', and after the request signal 15 shown in FIG. 5(c) is input from the CPU 1 to the graphics apparatus 31 at time t1, the graphics apparatus 31 outputs a receive signal 33 (see FIG. 5(d)) to the CPU 1 when it is capable of receiving in order to indicate to the CPU 1 that it is capable of receiving. Moreover, the request signal 15 that is input to the graphics apparatus 31, the status signal 36 and receive signal 33 that are output from the graphics apparatus 31 are input to the power-consumption-management apparatus 32, so when both the request signal 15 and receive signal 33 become 'H' (time t1), the second synchronization clock 14 shown in FIG. 5(f) is supplied from the power-consumption-management apparatus 32 to the graphics apparatus 31 during the period T2 from time t1 to the time tk when the request signal 15 becomes 'L' (in the figure this is the period from the time t2, which corresponds to the next clock after time t1, to the time, which corresponds to the next clock after time tk when the request signal 15 becomes 'L'). Therefore, in synchronization with the second synchronization clock 14 that is supplied to the graphics apparatus 31, the image data 16 shown in FIG. 5(e), which is output at the time when the request signal 15 becomes 'H', is input to the graphics apparatus 31.

Supply of the second synchronization clock 14 is stopped during periods T1 and T3 shown in FIG. 5, and these periods are periods when power consumption of the graphics apparatus 31 is reduced. Also, while the status signal 36 shown in FIG. 5 is 'H', the graphics apparatus 31 is in a state of waiting for output during the periods Ta and Tb when the graphics apparatus 31 does not receive the supplied second synchronization clock 14, and as will be explained in detail later, when the request signal 34 from the graphics apparatus 31 to the memory 4 is 'H', and when the receive signal 41 is 'L' (see FIG. 10(f)).

Figure 6:
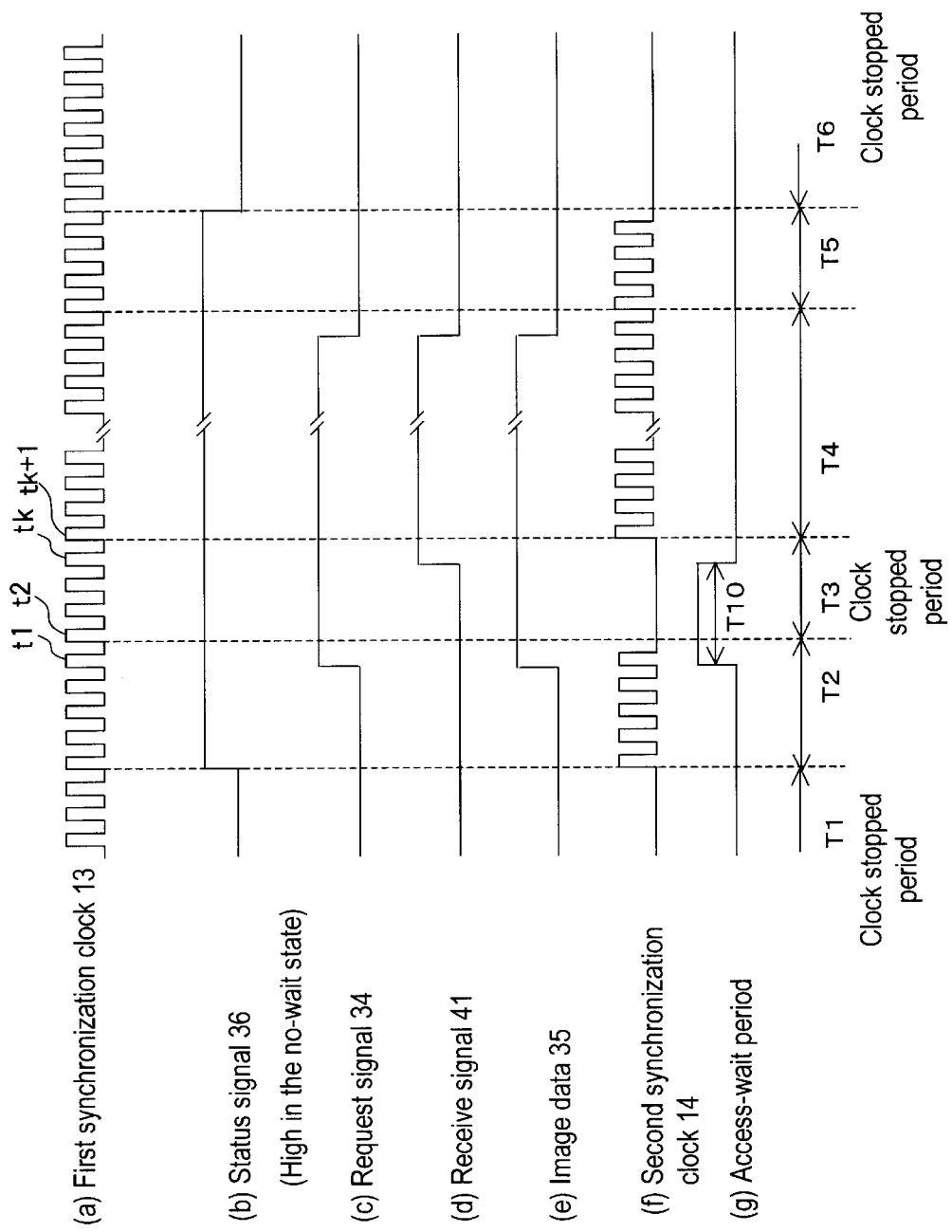
FIG. 6 is a time chart showing the output of data from the graphics apparatus to memory in the first embodiment of the invention.

FIG. 6 is a time chart showing the output of image data 35 from the graphics apparatus 31 to the memory 4.

When the status signal 36 shown in FIG. 6(b) is 'H', or in other words, when the graphics apparatus 31 is in the no-wait state, if the memory 4 is not capable for some reason of receiving the image data 35, even though the request signal 34 shown in FIG. 6(c) and the image data 35 shown in FIG. 6(e) are output from the graphics apparatus 31 at time t1, the memory 4 does not return a receive signal and input of image data 35 to the memory 4 is inhibited (see the access-wait period T10 shown in FIG. 6(g)). When the problem is removed at time tk, the status of the memory 4 changes from this state to a state of being capable of receiving data, and outputs a receive signal 41 (see FIG. 6(*d*)) to the graphics apparatus 31 indicating that it is capable of receiving.

Here, the second synchronization clock 14 as shown FIG. 6(*f*) is output from the power-consumption-management apparatus 32 to the graphics apparatus 31 during the period T2 from when the status signal 36 becomes 'H' until when the access-wait period T10 begins (in the figure, this is the period from when the status signal 36 becomes 'H' until the next clock after the access-wait period T10 begins), the period T4 from when the receive signal 41 becomes 'H' until it becomes 'L' (in the figure this is the period from the next clock after the receive signal 41 becomes 'H' until the next clock after the receive signal 41 becomes 'L'), and the period T5 from when the receive signal 41 becomes 'L' until the status signal 36 becomes 'L', and image data 35 are read from the graphics apparatus 31 to the memory 4 during the period T4 (see FIG. 6(*e*)).

The period T3 (in the figure, this is the period from the next clock after the access-wait period T10 begins until the next clock after it ends) is the period for waiting for the receive signal 41 from the memory 4 (see FIG. 6(*g*)) and supply of the second synchronization clock 14 is stopped. In other words, it is a period when the power consumption of the graphics apparatus 31 is reduced. Also, during the periods T1 and T6 shown in FIG. 6, the graphic apparatus 31 is in the wait state, and so the power-consumption-management apparatus 32 stops supply of the second synchronization clock 14.

Figure 7:
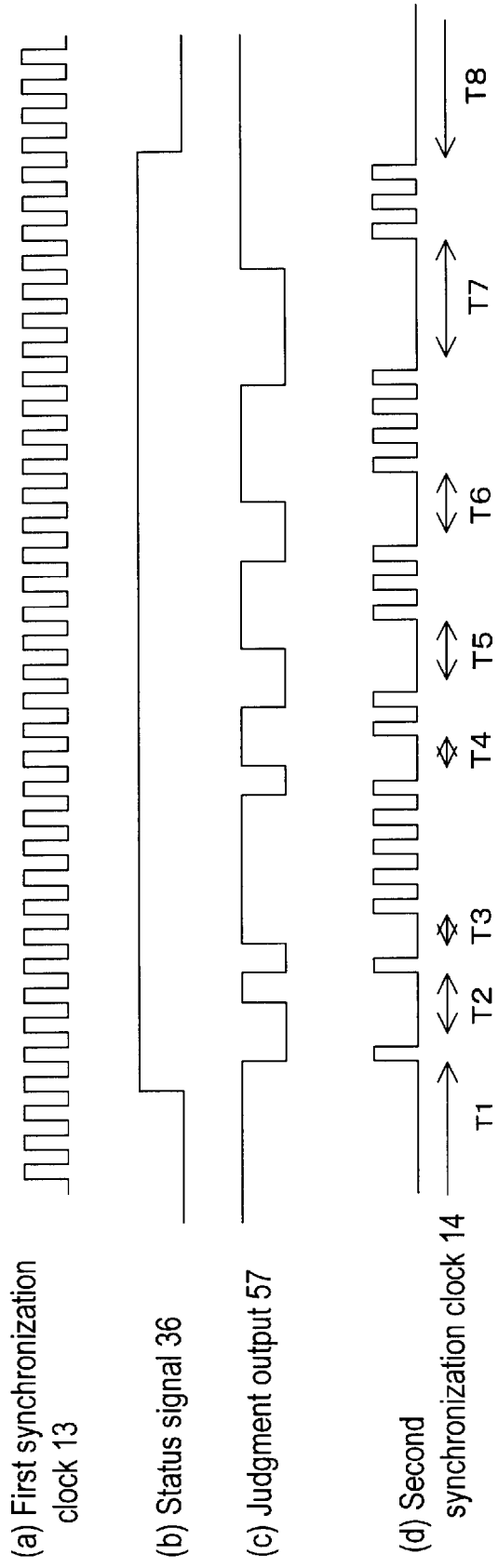
FIG. 7 is a time chart showing the relationships between the status signal, judgment output and synchronization clock in the first embodiment of the invention.

FIG. 7 summarizes the explanation above, and is a time chart showing the operation when the second synchronization clock 14 is supplied or stopped during the input, output or output-wait states, in which processing is taken into consideration.

As shown in FIG. 7(*a*), the first synchronization clock 13 is constantly supplied to the power-consumption-management apparatus 32. Here, the power-consumption-management apparatus 32 controls output of the second synchronization clock 14 according to the judgment output 57 shown in FIG. 7(*c*), even though the status signal 36 is 'H', indicating the no-wait state.

Here, when the status signal 36 is 'H', or in other words, the no-wait state, and the judgment output 57 shown in FIG. 7(*c*), which indicates the graphics apparatus 31 is in the progress of input, output or processing, becomes 'H', the power-consumption-management apparatus 32 supplies the second synchronization clock 14 to the graphics apparatus 31, and when the judgment output 57 becomes 'L', it stops supplying the second synchronization clock 14. During period T1 and period T8 shown in FIG. 7(*d*), the graphics apparatus 31 is in the wait state, and supply of the second synchronization clock 14 is stopped, and during periods T2, T3, . . . , T7 shown in FIG. 7, the graphics apparatus 31 is in the no-wait state, however, it is waiting for input or output and no processing is performed, so the power-consumption-management apparatus 32 stops supplying the second synchronization clock 14. Therefore, supply of the second synchronization clock 14 is stopped during periods T1, T2, T3, . . . ., T7 and T8 shown in FIG. 7, and during these periods power consumption by the graphics apparatus 31 is reduced.

Figure 8:
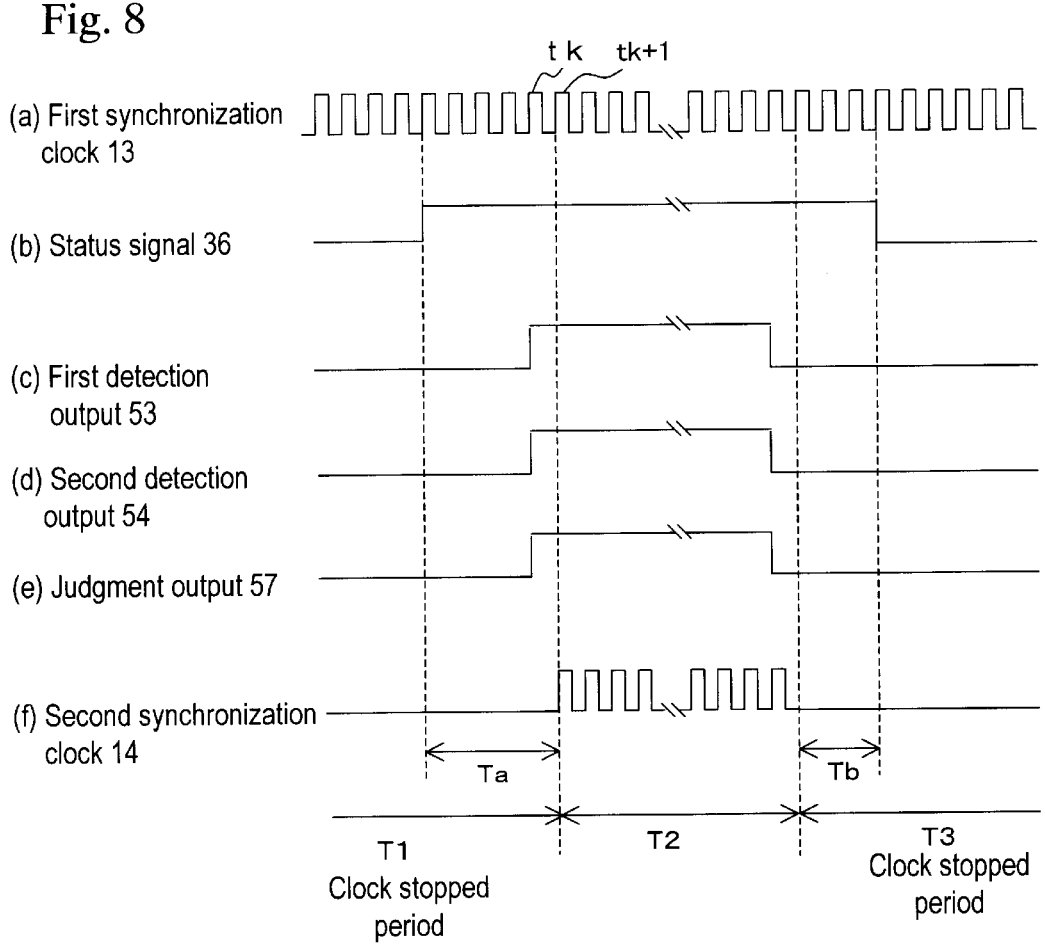
FIG. 8 is a time chart showing the relationships between the detection output, judgment output and synchronization clock in the first embodiment of the invention.

Next, the time chart showing the operation of the power-consumption-management apparatus 32 will be explained. FIG. 8 is a time chart showing the relationship between the first detection output 53 and second detection output 54 and the second synchronization clock 14.

When the status signal 36 shown in FIG. 8(*b*) is 'H', the detection means 50 of the power-consumption-management apparatus 32 detects a request signal 15 and receive signal 33 at time tk of the first synchronization clock 13 shown in FIG. 8(*a*). As a result of detecting the request signal 15, the first detection output 53 shown in FIG. 8(*c*) becomes 'H', and as a result of detecting the receive signal 33, the second detection output 54 shown in FIG. 8(*d*) becomes 'H'. Based on these results, the judgment means 51 determines that the graphics apparatus 31 is inputting image data 16 shown in FIG. 5(*e*), and so as shown in FIG. 8(*e*), it inputs judgment output 57 to the supply-control means 52 as 'H'. Also, when the first detection output 53 and second detection output 54 become 'L', it makes judgment output 57 become 'L'.

After receiving this, the supply-control means 52 supplies the second synchronization clock 14 to the graphics apparatus 31 for a period T2 from when the judgment output 57 becomes 'H' until it becomes 'L' (in the figure, this is the period from time tk+1, which corresponds to the next clock after time tk when the judgment output 57 becomes 'H', until the next clock after the time when the second detection output becomes 'L'), however, as was explained for FIG. 5, during periods Ta and Tb shown in FIG. 8 when the request signal 34 is 'H' and the receive signal 41 is 'L' (periods when the judgment output 57 is 'L' even though the status signal 36 is 'H'), the graphics apparatus 31 waits for output and supply of the second synchronization clock 14 is stopped (see FIG. 10(*f*)). In other words, during periods T1 and T3 when the judgment output 57 is 'L', the supply-control means 52 stops the supply of the second synchronization clock 14. Therefore, these periods when supply of the second synchronization clock 14 is stopped, are periods when the power consumption of the graphics apparatus 31 is reduced.

Figure 9:
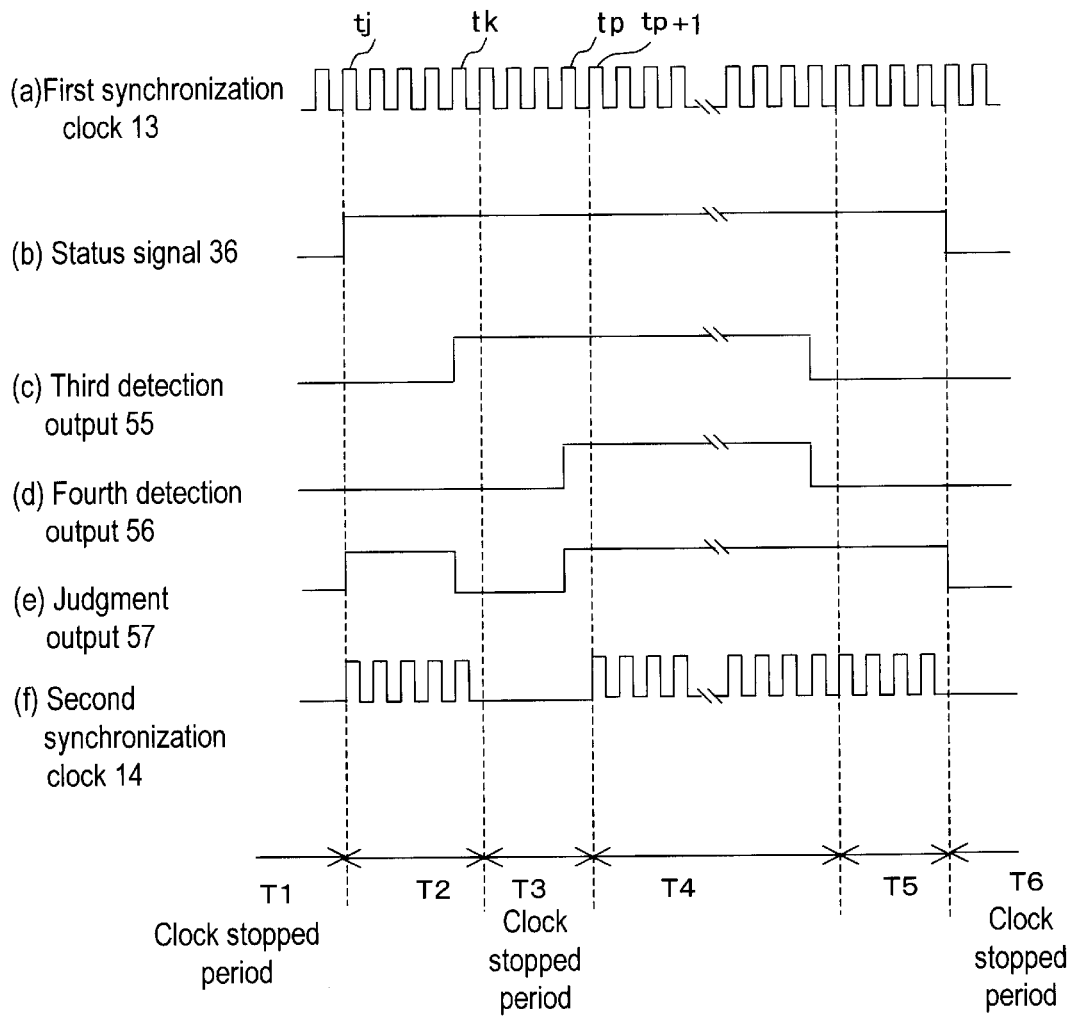
FIG. 9 is a time chart showing the relationships between the detection output, judgment output and synchronization clock in the first embodiment of the invention.

FIG. 9 is a time chart showing the relationship between the third detection output 55 and fourth detection output 56 and the second synchronization clock 14.

As shown in FIG. 9(*b*), when the status signal 36 is 'H', the detection means 50 of the power-consumption-management apparatus 32 detects a request signal 34 at time tk as shown in FIG. 9(*a*), and detects a receive signal 41 at time tp of the first synchronization clock 13, and as a result of detecting the request signal 34, the third detection output 55 shown in FIG. 9(*c*) becomes 'H', and as a result of detecting the receive signal 41, which indicates that the memory 4 is capable of receiving data, the fourth detection output 56 shown in FIG. 9(*d*) becomes 'H'.

Based on these detection results, when the third detection output 55 is 'L', or in other words, when there is no request signal 34, or when the fourth detection output 56 is 'H', or in other words, when the receive signal 41 is 'H', the judgment output 57 shown in FIG. 9(*e*) that is output from the judgment means 51 becomes 'H' and is output to the supply-control apparatus 52 (see FIG. 10(*a*) and FIG. 10(*g*); FIG. 10(*e*) is undefined). This indicates that the judgment means 51 determines that the graphics apparatus 31 is performing a process during period T2 (period from the time tj when the status signal 36 becomes 'H' until the next clock after time tk when the third detection output 55 (corresponding to request signal 34) becomes 'H') as shown in FIG. 9(*e*), and that the judgment means 51 determines that the graphics apparatus 31 is outputting the image data 35 shown in FIG. 6(*e*) to the memory 4 during a period T4 when the fourth detection output 56 shown in FIG. 9(*d*) is 'H' (in the figure, this is the period from the time tp+1, which corresponds to the next clock after time tp when the fourth detection output 56 (corresponding to the receive signal 41) becomes 'H', until the time, which corresponds to the next clock after the time when the fourth detection output 56 becomes 'L').

Furthermore, the judgment means 51 determines that the graphics apparatus 31 is performing internal processing after the third detection output 55 becomes 'L' and the status signal 36 is 'H', so it keeps the status of the judgment output 57 as 'H'.

Therefore, during the periods T2, T4 and T5 that correspond to when the judgment output 57 from the judgment means 51 is 'H', the supply-control means 52 supplies the second synchronization clock 14 to the graphics apparatus 31, and during the periods T1, T3 and T6 that correspond to when the judgment output 57 is 'L', the supply-control means 52 stops the supply of the second synchronization clock 14. These periods when the supply of the second synchronization clock 14 is stopped are periods when the power consumption of the graphics apparatus 31 is reduced.

Next, the operation of supplying and stopping the second synchronization clock 14 is shown in FIG. 10 as a Boolean truth-value table. In the truth-value table of FIG. 10, 'x' signifies that the value is '0' or '1', and '–' signifies the value is undefined.

As shown in FIG. 10, the input columns of the truth-value table are for request signal 15, receive signal 33, request signal 34, receive signal 41 and status signal 36, and the output columns is for the supply or stoppage of the second synchronization clock 14, and the graphics apparatus column shows the operating status of the graphics apparatus 31.

In the status shown in FIGS. 10(*a*), (*c*), the second synchronization clock 14 is supplied to the graphics apparatus 31 from the power-consumption-management apparatus 32, and the graphics apparatus 31 is processing image data 16 that were input from the CPU 1. In the input status shown in FIG. 10(*d*), the second synchronization clock 14 is supplied to the graphics apparatus 31 and the graphics apparatus 31 is in the progress of receiving the input of image data 16 from the CPU 1. Moreover, in the input status shown in FIG. 10(*f*), request signal 34 is 'H', and request signal 15, receive signal 33 and receive signal 41 are all 'L', and status signal 36 is 'H', the supply of the second synchronization clock 14 from the power-consumption-management apparatus 32 is stopped and the graphic apparatus 31 is waiting to output data to the memory 4. Also, in the input status shown in FIG. 10(*g*), the second synchronization clock 14 is supplied to the graphics apparatus 31, and the graphics apparatus 31 is in the progress of outputting image data 35 to the memory 4. Moreover, in the input status shown in FIG. 10(*h*), the graphics apparatus 31 is in the wait state, and supply of the second synchronization clock 14 is stopped.

When the input status is summarized into a Boolean equation, the following equation (Equation 1) for S is obtained. In this equation, '+' indicates a logical sum, '&' indicates a logical product and 'not' indicates a negation.

$$S = (\text{Request signal 15}) + ((\text{not Request signal 34}) \& \text{ Status signal 36}) + (\text{Receive signal 41}) \quad \text{(Equation 1)}$$

Request signal 15, receive signal 33, request signal 34, receive signal 41 and status signal 36 are also input to the power-consumption-management apparatus 32, and S in Equation 1 corresponds to the output from the judgment means 57 of the power-consumption-management apparatus 32, so Equation 1 satisfies the combinations of the truth values of each signal, and when S in Equation 1 is '1', or in other words, when the graphics apparatus 31 is performing input, processing or output and the judgment output 57 becomes 'H', it indicates that the second synchronization clock 14 is supplied to the graphics apparatus 31 from the power-consumption-management apparatus 32, and for all other conditions, the second synchronization clock 14 is not supplied.

In this first embodiment described above, the data-processing apparatus 31 shown in FIG. 1 is taken to be a graphics apparatus, however the data-processing apparatus 31 could also be a cache memory or other kind of data-processing apparatus.

Figure 11:
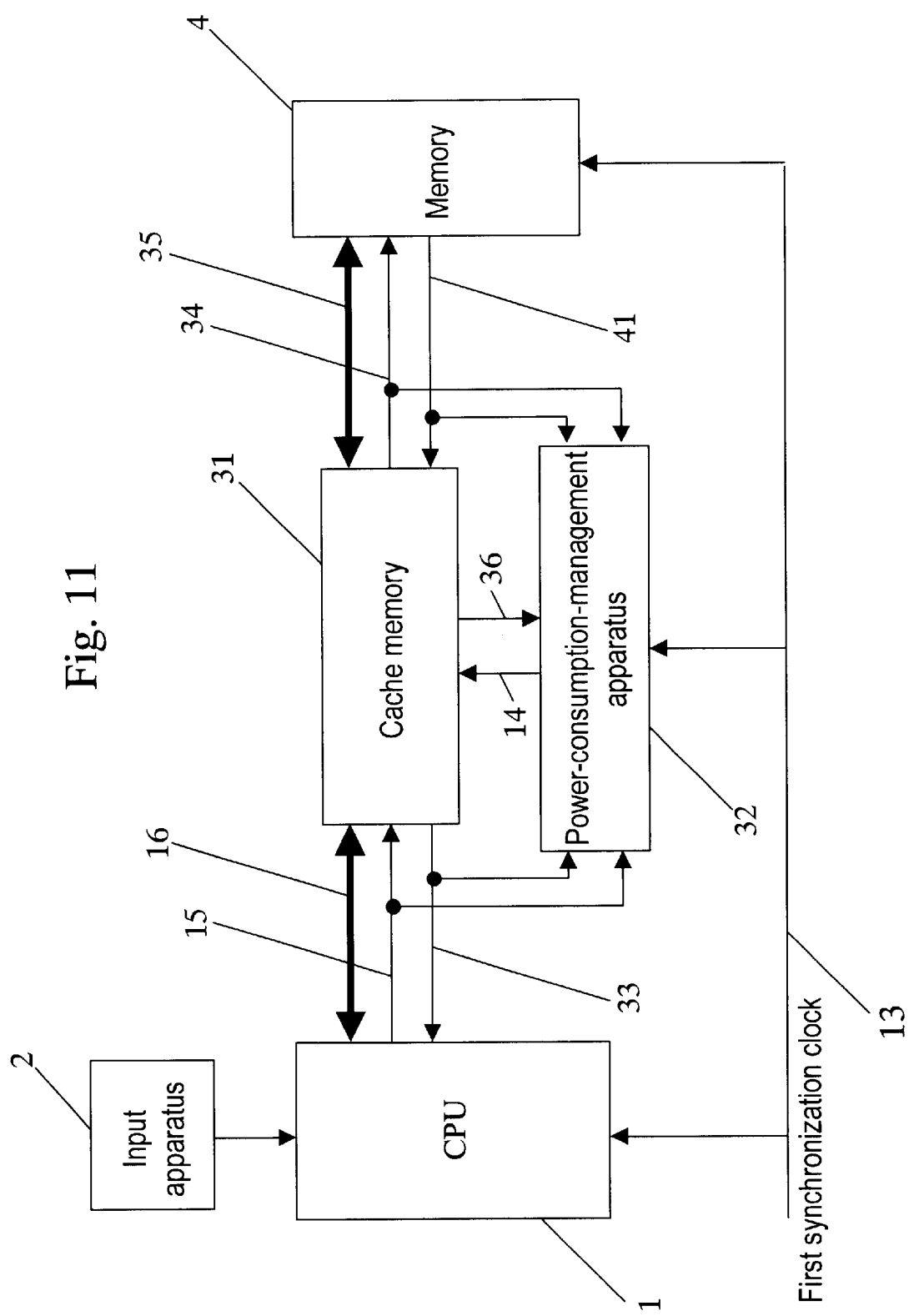
FIG. 11 is a block diagram of the functions of an information-processing apparatus that uses a cache memory in the first embodiment of the invention.

FIG. 11 is a block diagram of the functions of an information-processing apparatus where a cache memory is used as the data-processing apparatus 31, and here only the points of its operation that differ from the operation explained above with reference to the structure shown in FIG. 1 of the first embodiment and the time charts shown in FIG. 5 to FIG. 9, will be explained.

The information-processing apparatus frequently performs data transfer between the CPU 1 and memory 4, however, there is a large difference between the processing speed of the CPU 1 and the access speed of the memory 4, so a cache memory 31 having a buffer function is provided for the data so that the processing speed of the overall information-processing apparatus does not decrease. The power consumption of this cache memory 31 is managed by the power-consumption-management apparatus 32, and based on request signal 15, receive signal 33, request signal 34, receive signal 41 and status signal 36, the power-consumption-management apparatus 32 performs control for reducing the power consumption of the cache memory 31.

When the CPU 1 acquires data from the memory 4, it checks the cache memory 31, and when the necessary data are in the cache memory 31, it uses that data. However, when the necessary data are not in the cache memory 31 (called cache missing), the cache memory 31 accesses the slower memory 4, and reads tens or hundreds of bytes of data from the memory 4, and fills the cache.

When doing this, the cache memory 31 outputs a request signal 34 to the memory 4 and waits for the receive signal 41 to be input from the memory 4. Similar to the access-wait period T10 shown in FIG. 6(*g*), this can be a period when supply of the second synchronization clock 14 to the cache memory 31 is stopped, and the power-consumption-management apparatus 32 stops supply of the second synchronization clock 14 to the cache memory 31. Therefore, in the case that the memory 4 is slow, the access-wait period becomes longer by that amount, so power consumption of the cache memory 31 is greatly reduced by having the power-consumption-management apparatus 32 stop supply of the second synchronization clock 14 during the access-wait period.

Also, this first embodiment is constructed such that the power consumption of the graphics apparatus 31 is managed by the power-consumption-management apparatus 32, however, it is also possible to place the power-consumption-management apparatus on the CPU 1 side, and to control the second synchronization clock 14 when the CPU 1 accesses a slow apparatus and reduce the power consumption of the CPU 1.

As was explained above, with this embodiment, when the data-processing apparatus (graphics apparatus) 31 is in the wait state, the supply of the second synchronization clock 14 to the data-processing apparatus (graphics apparatus) 31 from the power-consumption-management apparatus is stopped, and based on the request signal 15, receive signal 33, request signal 34, receive signal 41 and status signal 36, the power-consumption-management apparatus 32 controls the supply of or stoppage of the second synchronization clock 14 to the data-processing apparatus (graphics apparatus) 31 even when the data-processing apparatus (graphics apparatus) 31 is in the no-wait state. In other words, the power-consumption-management apparatus 32 manages the data input, output or processing status of the data-processing apparatus (graphics apparatus) 31 via an interface, and determines whether or not the second synchronization clock 14 should be supplied. Therefore, it is possible for the power-consumption-management apparatus 32 to supply the second synchronization clock 14 and let the data-processing apparatus (graphics apparatus) 31 operate only when the data-processing apparatus (graphics apparatus) 31 is inputting, outputting or processing data, even though the data-processing apparatus (graphics apparatus) 31 is in the no-wait state, and thus with the clock control of this embodiment, it is possible to optimally reduce power consumption of the data-processing apparatus (graphics apparatus) 31.

Also, in comparing the supply of the second synchronization clock 14 by the clock control of this first embodiment shown in FIG. 7(d) with the supply of the second synchronization clock 14 by the prior clock control shown in FIG. 15(c), the supply of the second synchronization clock 14 by the clock control of this first embodiment is stopped more frequently. Therefore, it can be seen that the clock control of this first embodiment greatly contributes to reducing the power consumption of the data-processing apparatus (graphics apparatus) 31.

(Embodiment 2)

In the first embodiment described above, only one data-processing apparatus or graphics apparatus 31 was used, however it is also possible to use a plurality of units by connecting graphics processors 31 together such that they are dependent.

Figure 12:
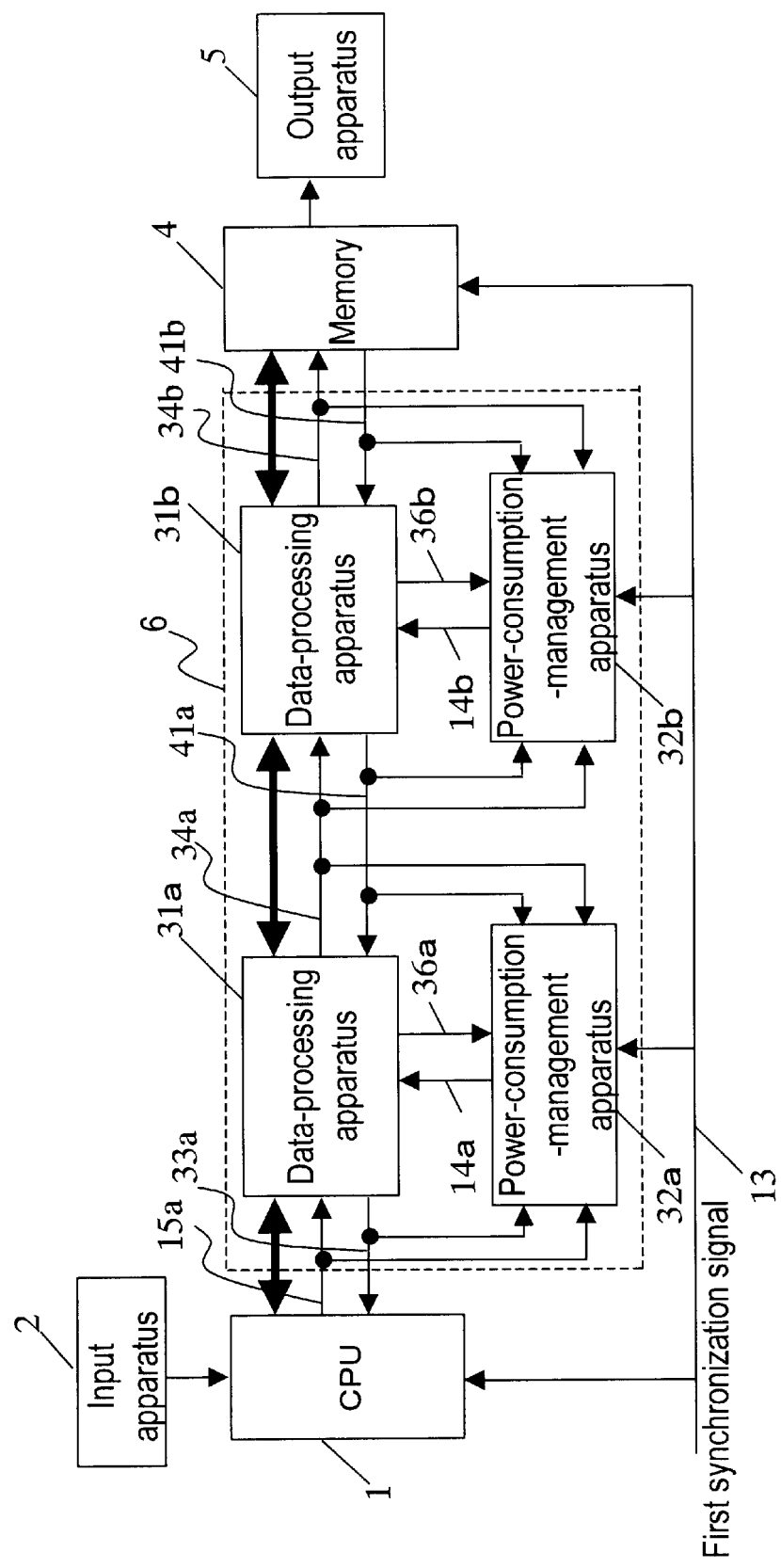
FIG. 12 is a block diagram of the functions of an information-processing apparatus of a second embodiment of the invention.

FIG. 12 is a block diagram of the functions of an information-processing apparatus of this second embodiment, and only the points that differ from the construction of the first embodiment will be explained here.

As shown in FIG. 12, a data-processing system 6 constructing the information-processing apparatus comprises: a first data-processing apparatus 31a, for example a graphics apparatus, and a second data-processing apparatus 31b, for example another graphics apparatus, where the graphics apparatus 31a is connected dependently in a beginning stage and the graphics apparatus 31b is connected dependently in a latter stage. Also, a power-consumption-management apparatus 32a independently manages the power consumption of the graphics apparatus 31a, and a power-consumption-management apparatus 32b independently manages the power consumption of the graphics apparatus 31b.

Graphics apparatus 31a and graphics apparatus 31b, which are connected dependently, form a pipeline. Also, in order that data processing in this pipeline flows orderly, each of these dependently connected apparatuses performs different processing, so the hardware specifications of graphics apparatus 31a and graphics apparatus 31b are the same, however, the processing specifications differ. For example, in the case that the graphics processing is a process to fill in an arbitrary shape with color, the graphic process is divided in the pipeline by dividing the process into a process for forming the shape outline, which is performed by the graphics apparatus 31a in the beginning stage of the pipeline, and a process for drawing inside the outline, which is performed by the graphics apparatus 31b in the latter stage of the pipeline.

Graphics apparatus 31a and graphics apparatus 31b are connected dependently as a pipeline, and as explained above, the power-consumption-management apparatus 32a manages the power consumption of graphics apparatus 31a, and power-consumption-management apparatus 32b manages the power consumption of graphics apparatus 31b. In other words, based on a request signal 15a that is output from the CPU 1, a receive signal 33a that is output from the graphics apparatus 31a, a request signal 34a that is output from the graphics apparatus 31a, a receive signal 41a that is output from the graphics apparatus 31b and a status signal 36a, the power-consumption-management apparatus 32a controls a first synchronization clock 13 and generates a second synchronization clock 14a to reduce the power consumption of the graphics apparatus 31a. Also, based on a request signal 34a that is output from the graphics apparatus 31a, a receive signal 41a that is output from the graphics apparatus 31b, a request signal 34b that is output from the graphics apparatus 31b, a receive signal 41b that is output from the memory 4 and a status signal 36b, the power-consumption-management apparatus 32b controls a first synchronization clock 13 and generates a second synchronization clock 14b to reduce the power consumption of the graphics apparatus 31b.

Figure 13:
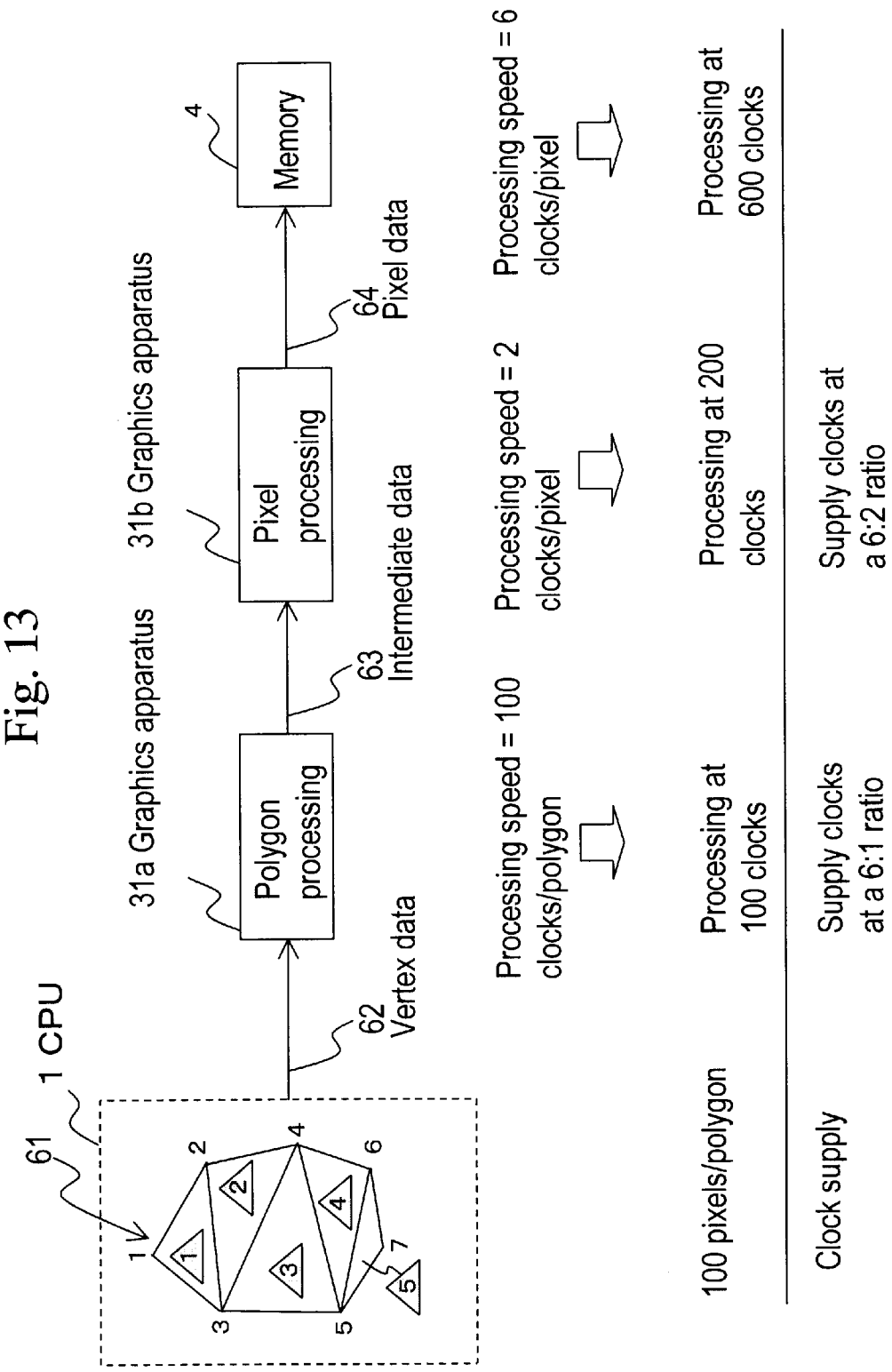
FIG. 13 is a drawing showing the flow of processing in the information-processing apparatus and the status of the clock control in the second embodiment of the invention.
Figure 14:
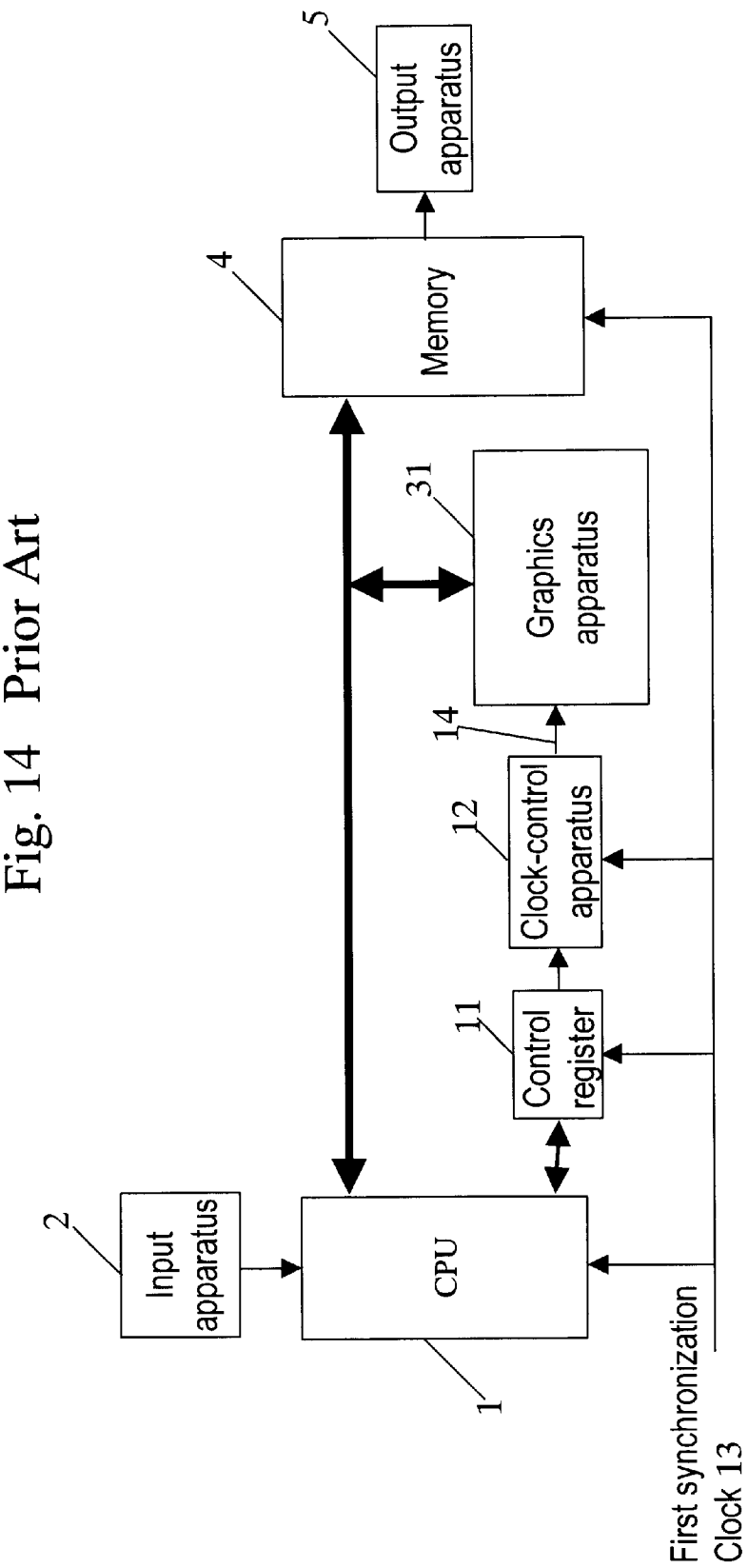
FIG. 14 is a block diagram of the functions of an information-processing apparatus using prior technology.

This second embodiment of the invention will be described in more detail below. FIG. 13 is a drawing showing the flow of the internal processing of the apparatuses corresponding to the information-processing apparatus shown in FIG. 12, and shows the status of the clock control. Here an example is given where the graphics apparatuses 31a, 31b perform 3-dimensional graphics processing.

Generally, as 3-dimensional image data in a computer, representing the surface of a 3-dimensional shape as a collection of polygons is common, also a triangular shape is often used as the shape of the polygon.

As shown at the top of FIG. 13, the CPU 1 obtains geometrical data 61 by way of the input apparatus 2 shown in FIG. 12. This geometrical data 61 consists of a plurality of polygons as shown in the upper portion of FIG. 13, and from these polygons, one polygon (triangle) is taken at a time, and the vertex data 62 of each polygon (triangle) is transferred to the graphics apparatus 31a, which performs polygon processing.

In the polygon processing executed by the graphics apparatus 31a, vertex parameters, which will be explained later, are found from the received vertex data 62. The vertex parameters that are found become intermediate data 63 and are transferred to the graphics apparatus 31b, which performs pixel processing. In the pixel processing executed by the graphics apparatus 31b, pixel data 64 are found in pixel units for each polygon (triangle), and those pixel data 64 are written in the memory 4.

The vertex parameters that are calculated in the polygon processing executed by the graphics apparatus 31a are: $\Delta X/\Delta Y$, $\Delta RGB/\Delta X$, $\Delta RGB/\Delta Y$, $\Delta Z/\Delta X$, $\Delta Z/\Delta Y$, where $\Delta X/\Delta Y$: Inclination of a side of the polygon (triangle)

$\Delta RGB/\Delta X$: Inclination of color in the X direction $\Delta RGB/\Delta Y$: Inclination of color in the Y direction $\Delta Z/\Delta X$: Inclination of depth Z in the X direction $\Delta Z/\Delta Y$: Inclination of depth Z in the Y direction.

Also, in the pixel processing executed by the graphics apparatus 31b, color is added in pixel units to the pixels using the data calculated in the polygon processing, and an address for the image on the screen is generated.

Moreover, the supply and stoppage, in other words, the clock control, of the second synchronization clocks 14a, 14b shown in FIG. 12 that are supplied to the graphics apparatuses 31a, 31b are as described below (see the lower portion of FIG. 13).

That is, the processing speed of the polygon processing is such that processing is performed in a fixed time regardless of the shape of the polygon (triangle). For example, that processing speed can be 100 clocks/polygon. Also, for example, the processing speed of the pixel processing can be 2 clocks/pixel, and the time for writing to memory is proportional to the access speed and can be 6 clocks/pixel. Moreover, when the number of pixels in one polygon is taken to be 100 pixels/polygon, the number of clocks required for processing one polygon in the polygon process (by graphics apparatus 31a) is 100 clocks, and in the pixel processing (by graphics apparatus 31b) is 200 clocks, and in writing to memory 4 is 600 clocks.

From doing this, the clock supply to graphics apparatus 31a and graphics apparatus 31b is as follows. That is, in graphics apparatus 31a, the receive signal 41 shown in FIG. 12 from graphics apparatus 31b is only returned at a ratio of 6:1 with respect to the first synchronization clock 13, so supply of the second synchronization clock 14a, based on control from the power-consumption-management apparatus 32a shown in FIG. 12, is also at a ratio of 6:1. Moreover, in graphics apparatus 31b, the receive signal 41b shown in FIG. 12 from the memory 4, is only returned at a ratio of 6:2 with respect to the first synchronization clock 13, so supply of the second synchronization clock 14b, based on control from the power-consumption-management apparatus 14b shown in FIG. 12, is also at a ratio of 6:2.

In this way, by turning the graphics process into a pipeline comprising polygon processing and pixel processing, it is possible for the power-consumption-management apparatuses 32a, 32b to perform control of the supply and stoppage of the clocks for each apparatus, and thus it is possible for the power-consumption-management apparatuses 32a, 32b to effectively reduce the power consumption of the graphics apparatuses 31a, 31b.

In this second embodiment, graphics apparatus 31a and graphics apparatus 31b are connected in two dependent stages, however, by further dividing the functions of the graphics processing, it is possible to connect graphics apparatuses in a plurality of dependent stages.

Also, in this second embodiment, one power-consumption-management apparatus is used to manage one graphics apparatus, however, it is also possible for one power-consumption-management apparatus to manage a plurality of graphics apparatuses.

With the embodiment described above, both the power-consumption-management apparatus 32a and power-consumption-management apparatus 32b operate independently, so they are not affected by differences in the graphics processing function, such as the different in the processing time among each graphics apparatus 31a, 31b. Also, even in a complex processing system such as a pipeline, both the power-consumption-management apparatus 32a and power-consumption-management apparatus 32b manage the input, output and processing status for all data, so they are capable of performing optimal clock control and thus make it possible to optimally reduce the power consumption of each apparatus.

In the first and second embodiments described above, the data-processing apparatus 31 was taken to be a graphics apparatus, cache memory or CPU, however, the invention is not limited to this, and the data-processing apparatus could also be a communications DSP (Digital Signal Processor), a MPEG (Moving Picture Experts Group) engine, DMA (Direct Memory Access) controller, MIDI (Music Instrument Digital Interface) chip, or the like.

In the description of the embodiments above, the expression 'next clock' was used, however, the invention is not limited to this. Also, not supplying the clock could be replaced with cutting the electric power.

Moreover, the embodiments described above are just examples of embodiments of the invention, and they do not limit the technical scope of the invention.

As described above, the power-consumption-management apparatus of this invention, manages the data input, output and processing status of the data-processing apparatus, and determines whether or not to supply a synchronization clock at the next clock time. In addition, construction is such that the power-consumption-management apparatus supplies a synchronization clock and lets the data-processing apparatus operate only when the data-processing apparatus is in the progress of performing data input, output or processing, even though the data-processing apparatus may be in the no-wait state during processing, including when waiting for input or output, so with this clock control it is possible to optimally reduce the power consumption of the data-processing apparatus. Moreover, the faster the processing speed of the data-processing apparatus is, the more possibility there is that differences will occur with processing speeds of peripheral apparatuses, so by using the power-consumption-management apparatus, it is possible to optimally reduce the power consumption of the data-processing apparatus, and in comparison with not performing the clock control described above the power consumption can be reduced from ⅓ to ½ or more.

Furthermore, in case of connecting data-processing apparatuses dependently such that the power consumption of each is managed by the power-consumption-management apparatus, processing is not affected by differences in graphics processing functions such as the difference in the processing time among each processing apparatus, and even in a complex processing system such as a pipeline, the power-consumption-management apparatus manages the input, output and processing status for all data, so it is capable of performing optimal clock control, and thus it is very effective in reducing the power consumption of each apparatus.

What is claimed is:

1. An apparatus comprising at least a first processing unit and a second processing unit, wherein the first processing unit performs first processing of input data and outputs the processed data, and the second processing unit performs second processing of data input from the first processing unit to the second processing unit, and outputs the processed data, the apparatus further comprising a power consumption management unit configured to judge whether the second processing unit is available to accept data input and the first processing unit is unavailable to perform data output, the power consumption management unit stopping supply of a clock to the second processing unit if an affirmative judgment is made.

2. The apparatus of claim 1, wherein the supply of a clock is controlled based on both a request signal for data output or data input that is output from the first processing unit or from the second processing unit and information about presence or absence of a response signal to the request signal.

3. The apparatus of claim 1 further comprising a third processing unit configured to perform third processing of data input from the second processing unit to the third processing unit, and output the processed data, wherein the power consumption management unit judges whether the third processing unit is unavailable to accept the data input and the second processing unit is available to perform the data output, the power consumption management unit stopping supply of a clock to the second processing unit if an affirmative judgment is made.

4. An apparatus comprising at least a first processing unit and a second processing unit, wherein the first processing unit performs first processing of input data and outputs the processed data, and the second processing unit performs second processing of data input from the first processing unit to the second processing unit, and outputs the processed data, the apparatus further comprising a power consumption management unit configured to judge whether the second processing unit is unavailable to accept data input and the first processing unit is available to perform data output, the power consumption management unit stopping supply of a clock to the first processing unit if an affirmative judgment is made.

5. The apparatus of claim 4, wherein the supply of a clock is controlled based on both a request signal for data output or data input that is output from the first processing unit or from the second processing unit and information about presence or absence of a response signal to the request signal.

* * * * *